March 27, 1928. 1,663,662
H. C. JONES
PHOTOGRAPHIC PRINTING FRAME
Filed Jan. 29, 1923 3 Sheets-Sheet 1

Inventor
Harry C Jones
By his Attorneys
Ward Crosby Smith

March 27, 1928. 1,663,662
H. C. JONES
PHOTOGRAPHIC PRINTING FRAME
Filed Jan. 29, 1923 3 Sheets-Sheet 2
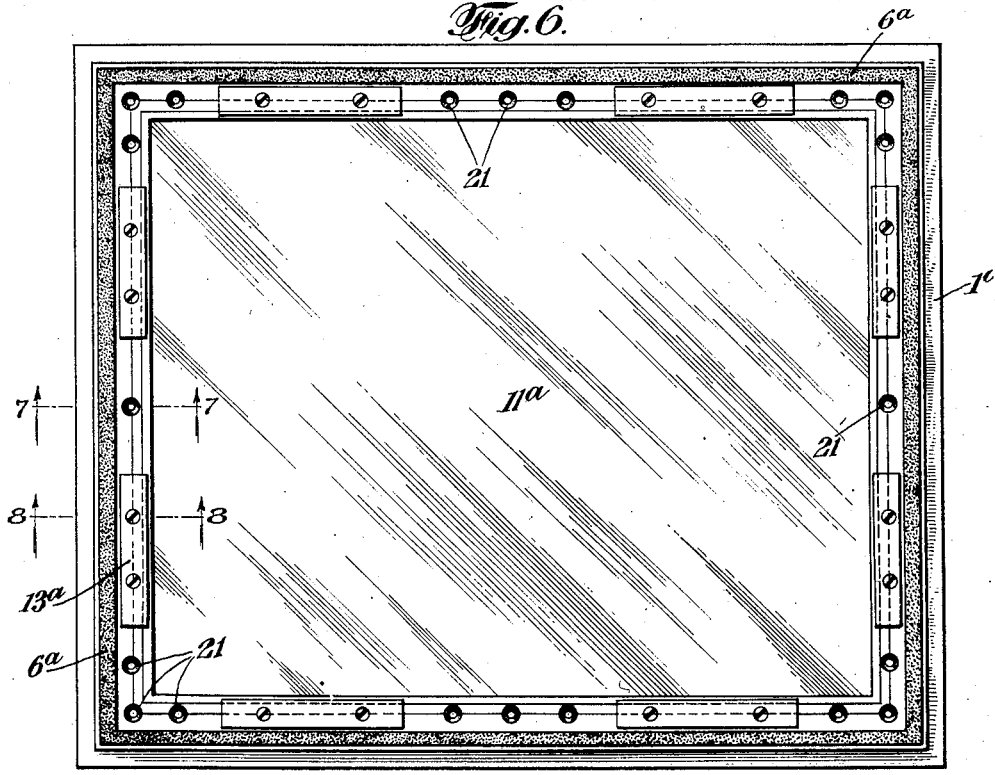
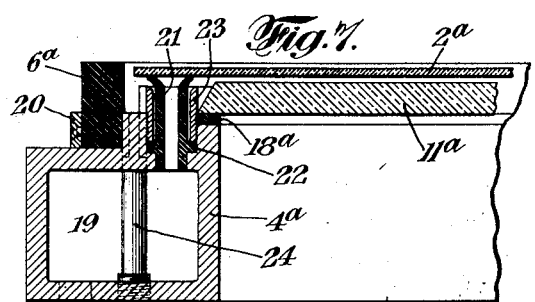
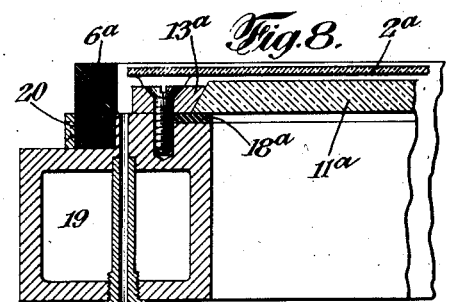
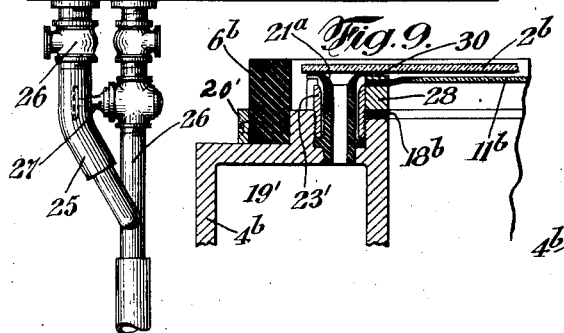
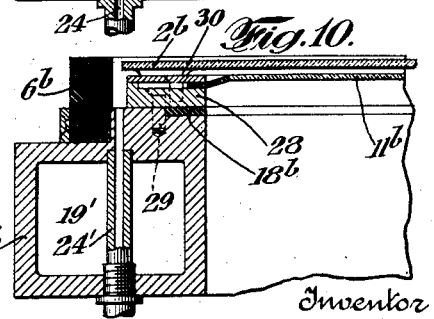
Inventor
Harry C. Jones
By his Attorneys March 27, 1928.  1,663,662
H. C. JONES
PHOTOGRAPHIC PRINTING FRAME
Filed Jan. 29, 1923  3 Sheets-Sheet 3
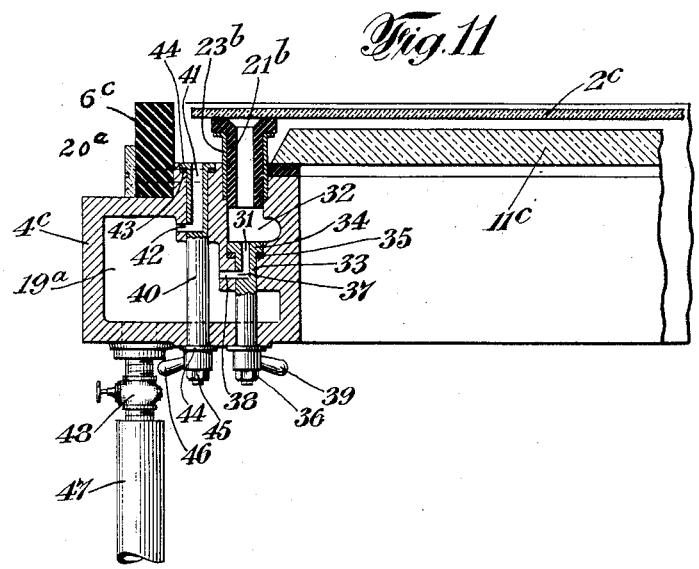
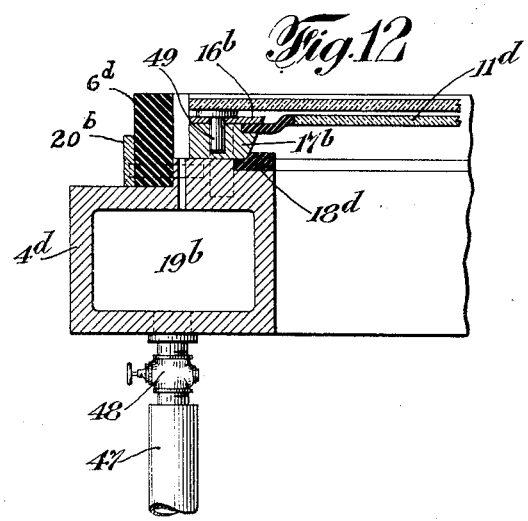
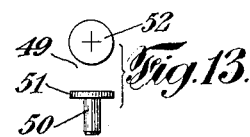
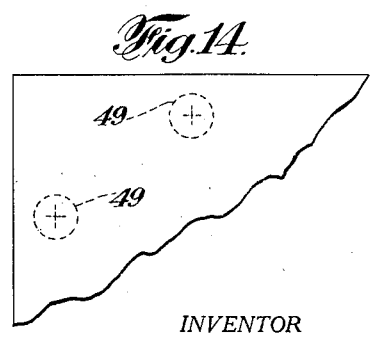
INVENTOR
Harry C Jones
BY his ATTORNEYS
Ward Crosby & Smith Patented Mar. 27, 1928.

1,663,662

UNITED STATES PATENT OFFICE.

HARRY C. JONES, OF LARCHMONT, NEW YORK, ASSIGNOR TO LITHOPRINTEX CORPORATION, OF NEW YORK, N. Y., A CORPORATION OF NEW YORK.

PHOTOGRAPHIC PRINTING FRAME.

Application filed January 29, 1923. Serial No. 615,487.

My invention relates to photographic printing frames, and the invention is especially useful for contact printing from a negative or other transparency onto a sensitized surface of greater area than said negative and which for one reason or another is not conveniently placeable or capable of being placed wholly within a printing frame.

The invention contemplates a frame for supporting and positioning the negative for proper registration, and means for sealing the frame and negative upon a portion only of the sensitized surface, then creating a vacuum in the space between the parts to produce firm contact between the negative and the coextensive sensitized surface so that the negative and sensitized surface may then be exposed to a light source and result in a clear print on the sensitized surface.

It is old to provide printing apparatus known as printing frames for contact printing, which consist, generally stated, of a rubber blanket having marginal flanges extending around the same to engage a thick glass pressure plate so that a space is formed between the said thick glass pressure plate, the blanket and its marginal edges which engage the glass plate, which space is adapted to receive the entire sensitized surface, such for example as a sensitized zinc plate, and also the negative from which the design is to be printed upon the zinc. When the zinc and negative are placed within this space and the glass latched down on the rubber blanket, air is pumped out of the space, and when firm contact is provided between the negative and the sensitized surface, a print is made by suitable exposure to a light source. Such apparatus does not lend itself to contact printing in cases where for one reason or another it is impossible or undesirable to put the entire sensitized surface within the confines of the rubber blanket and glass pressure plate, or where no blanket can be used.

It has also been proposed to improve on the above described apparatus by providing a frame of the same general size as the negative, laying the negative down on the horizontal sensitized surface and placing the frame on the sensitized surface around the negative in such manner as to produce a seal between the corresponding portion of the sensitized surface and the frame, and another seal between the frame and the marginal portions of the negative so as to seal off only the space between these parts. But with such apparatus one cannot accurately position the negative either on or with respect to the frame, and must rely for registration, upon the proper shifting and positioning of the negative directly onto the sensitized surface, due to some marks on the latter. Furthermore, such an arrangement does not permit of printing while the negative and sensitized surface are in an upright position; whereas, it is important to be able to very accurately position the negative with respect to some definite reference point before it is brought into contact with the sensitized surface, and to position it independently of any marks on the sensitized surface, and it is also important to be able to position the negative against the sensitized surface while the members are in an upright position.

One of the objects of my invention is to permit contact printing between a negative and a portion only of a sensitized surface, utilizing a frame to hold the negative and support it in proper position for printing on the zinc, and also utilizing the pneumatic pressure idea to force the negative and sensitized surface in firm contact without having to seal in the entire sensitized surface. By such apparatus the positioning of the negative at the desired location with respect to the sensitized surface, as well as the printing from the negative onto the surface, can all be done in an upright position of the parts and with great accuracy of registration; as for example in an upright photocomposing machine.

According to my invention I am enabled to seal off any selected part or portion of the whole sensitized surface corresponding to the size of the negative used and exhaust air from the space between such portion only of the sensitized surface and the negative so as to produce the desired firm contact, and this can be done while the sensitized surface, as stated, is held in any position or supported in some special machine. The invention is applicable to printing on any suitable sensitized surface.

Another object of the invention is the provision of a frame having registration means adapted to fit physical registration means of the negative so that by such fitting parts the negative is secured in a predetermined position on the frame, and more particularly to provide a removable means in the frame for accurately positioning the negative upon the frame, which means may be secured to the negative in such manner as to serve as physical registration means, so that when the negative is properly positioned, as for example upon a registration table, such means may be brought into contact with the negative and cemented thereto, whereupon when such means are fitted into the vacuum frame the negative is thereby assured of being properly positioned in the frame so that prints thereof on the sensitized surface will register with prints from another properly positioned negative of some other color of the same subject, the purpose and object of which are well understood in the art.

A further object of the invention is the provision of pneumatic pressure holding means for securing the negative in position on the frame independent of the vacuum produced for bringing the negative into contact with the sensitized surface and before the latter operation. A further object of the invention in connection with this latter operation is the provision in the frame, of a vacuum chamber with which the latter mentioned pneumatic holding means may be connected so that the necessary vacuum for holding the negative in position on the frame may be maintained through connection to this vacuum chamber, even after the frame may be set aside for some time and without having to keep a continuously operating suction-creating device, such as a pump, in operation in order to prevent the negative from becoming displaced on the frame or falling off of it.

The invention consists in the novel features, arrangements and construction and combinations of parts hereinafter more fully described in connection with the preferred embodiments thereof, and the invention will be more particularly set forth in the appended claims.

Further objects and advantages of the invention will more fully appear from the following description taken in connection with the accompanying drawings illustrating by way of example the preferred embodiments of the invention, and in which Fig. 1 illustrates a plan view of one form of pneumatic or vacuum frame embodying the invention and with the negative removed;

Fig. 6 is a plan view of another form of frame embodying the invention utilizing the pneumatic means for holding the negative onto the frame before the printing operation;

Fig. 7 is an enlarged sectional view taken on line 7—7 of Fig. 6;

Fig. 8 is a similar view taken on line 8—8 of Fig. 6;

Figs. 9 and 10 are sectional views of a part of a frame embodying still a further modification;

Fig. 11 is a sectional view of a frame showing another modification embodying the vacuum chamber;

Fig. 12 illustrates a further modification; and

Figs. 13 and 14 illustrate details.

Figure 1:
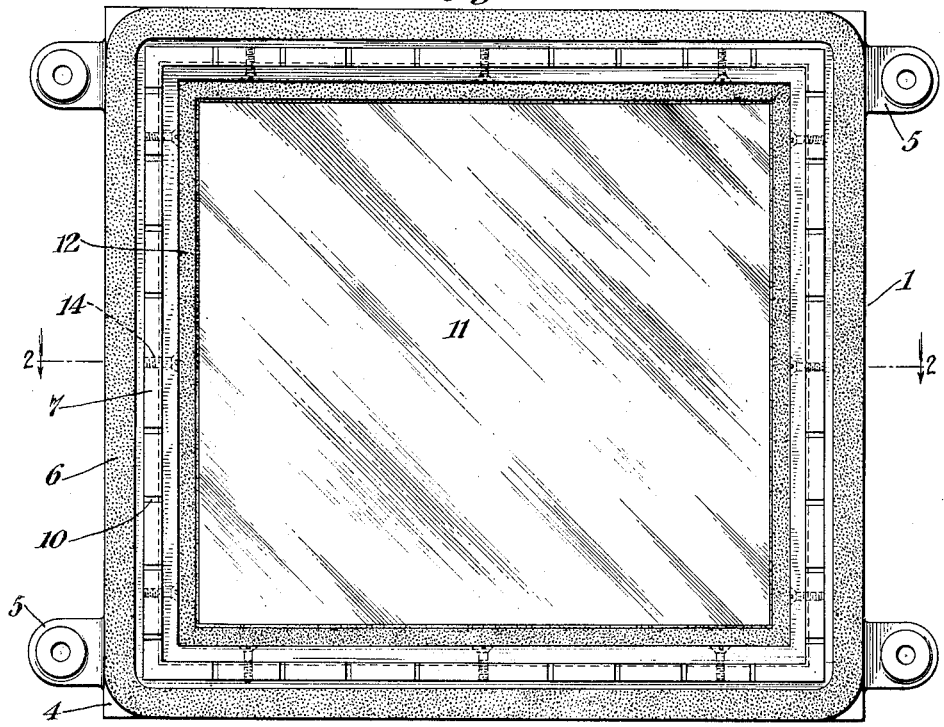

The printing frame may consist of a rectangular or other shaped frame 1 suitable for receiving and supporting the negative 2 to be used, and this frame member 1 is provided with an opening 3, of any convenient form, for the passage of the light through the negative onto the sensitized surface. The main frame member 4 may be made of wood or metal and provided if desired, with any suitable means, such as lugs 5, for securing it to any movable carriage or the like, for shifting the frame in front of the sensitized surface. The main frame member 4 is provided on its front side with a sealing member 6 which extends completely around the frame for sealing it onto the sensitized surface 7. This sealing member normally projects somewhat above the top surface of the negative 2 so that it may be compressed to insure an efficient seal notwithstanding the presence of the negative 2 interposed between the frame and the sensitized surface.

Figure 5:
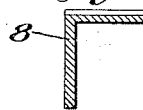
Fig. 5 shows a detail.

In order to support and secure the negative in proper position upon or within the frame, I provide means such as the member 8, movably mounted on the frame. In the present form under discussion this member 8 takes the form of a rectangular metal support of angle iron section as more clearly shown in Fig. 5, and it is removably mounted on the main frame member 4 by means of a deep groove 9 extending around the frame and in which the vertical flange of the member 8 slidably fits, the fit being such that the member 8 may be readily removed from and inserted in the groove and yet will not fit the same so loosely that it will not serve as an accurate means of positioning the negative within the frame when the negative is secured to said part 8. In the present form this metal part 8 has its upper surface suitably grooved or slotted as shown at 10, and the negative is cemented onto this upper surface at suitable points preferably in a manner hereinafter described, and then the part 8 with the negative thus fixedly secured thereto may be positioned and supported on the frame by simply slipping the member 8 into the groove 9. In cementing the negative to the top of this part 8 it need only be cemented at a sufficient number of points to insure good attachment, and in order to insure that under no circumstances will the cementing of the negative to this member block the passage of air between the top surface of this member and the bottom surface of the negative where it engages this member, the grooves 10 are provided. They insure the free passage of the air, so that the air on both surfaces of the negative may be exhausted as hereinafter described.

The frame is also provided with a suitable enveloping or covering transparent backing up or pressure member 11 which may take the form of either a diaphragm or a rigid plate. In this instance it takes the form of a celluloid sheet substantially covering the opening 3 and having suitably secured to its edges a rubber strip 12 the free edges of which are suitably attached to the frame as by means of the rectangular clamping frame 13 held in position in any suitable manner such as by screws 14. Suitable means of communication, such as an opening 15 through the frame, is also provided for exhausting the air from the sealed off space so as to cause the pressure diaphragm 11 to force the negative down into firm contact with the adjacent surface of the sensitized zinc plate. This vacuum may be created by connecting the passage 15 to any suitable apparatus for this purpose.

When this vacuum is created the rubber strip 12 will yield to allow the diaphragm 11 to be forced against the negative and to cause it to engage and force the negative up against the zinc plate. As the suction apparatus is started the air will be sucked not only from the space between the negative and the zinc plate, but it will also be sucked through the grooves 10 in the upper surface of the supporting member 8 so as to exhaust the space between the lower surface of the negative and the pressure diaphragm 11 to produce the above described movement of the same to force the negative in contact with the zinc plate. It will be seen from this that the frame and diaphragm constitute an enveloping means completely enveloping the negative upon that portion of the zinc plate corresponding substantially to the area of the negative.

By this arrangement the negative is first accurately positioned upon the frame and then the frame may be moved by suitable precision means of a photo-composing machine to any desired portion of the sensitized surface upon which it is desired to make the print, without bringing either the frame or the negative in contact with the sensitized surface and after the negative has been brought to the exact desired location adjacent the zinc the frame may then be moved, while in a vertical position, up against the zinc plate so as to cause the sealing member 6 to firmly contact with the zinc plate, whereupon the suction apparatus may be started to produce the desired pneumatic pressure on the enveloping diaphragm 11.

With regard to the positioning of the part 8 under the negative and the securing of the same to the negative so that said part 8 may act as, what might be termed physical registration means, or a physical registration mark for insuring proper positioning of the negative in the frame, this positioning is preferably accomplished in the following manner: The negative is placed on a registration frame or table the general character of which is well known and understood in the art, and while in or upon that frame, through suitable precision means with or without suitable registration means, the negative is so positioned on that frame that the image on the negative is properly registered with respect to component images for different colors to be used in making up a component colored picture or the like. When the negative is brought to this desired position, the metal part 8, which might be removably mounted and accurately positioned on a vertically moving carriage on the registration table immediately below the negative, may then be moved up into contact with the marginal portion of the negative; having first had an adhesive applied to certain portions of its upper surface, so that when it is brought into contact with the negative, the two will be cemented together at intervals. When the cement has sufficiently dried to insure adhesion of the negative with this physical registration means 8, the negative may then be taken from the registration table and is then ready at any time to be mounted in the vacuum frame 1 by simply slipping the metal part 8 into the slots 9.

When the metal part 8 is thus slipped into the slots 9 it is assured that the image on the negative then bears the same relation to the vertical and horizontal axes of the vacuum frame that it bore to the vertical and horizontal axes of the registration frame, so that when the vacuum frame is accurately aligned in a suitable machine for printing from the negative onto the sensitized surface, prints from the negative bearing one color will properly register with prints from another negative bearing a different color of the component color job to be produced, as is understood in the art. It will be clear from this that the means for securing and positioning the negative in the vacuum frame are in the nature of physical registration means for the negative and therefore serve this double function, and once this physical registration means is applied to the negative it can be filed away and taken out again at any time and put back into the vacuum frame and printed from without having to be returned each time to the registration table for re-alignment and registration.

The printing frame apparatus thus described not only has the advantage of being able to utilize pneumatic pressure for proper contact by exhausting air from substantially only that area of the sensitized surface corresponding to the area of the negative, but it enables the negative to be supported on the frame with accurate registration, and it also permits of the movement of the frame carrying the negative, in a vertical plane without disturbing the position of the negative on the frame, and permits of the use of the frame in a machine in which the sensitized zinc plate may be mounted in an upright position.

Figure 2:
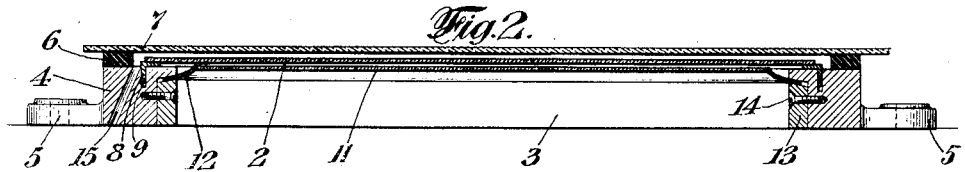
Fig. 2 shows a cross-sectional view of the same, taken on line 2—2 of Fig. 1, but with the negative in position on the frame, and with the frame placed against a portion of a sensitized surface.
Figure 3:
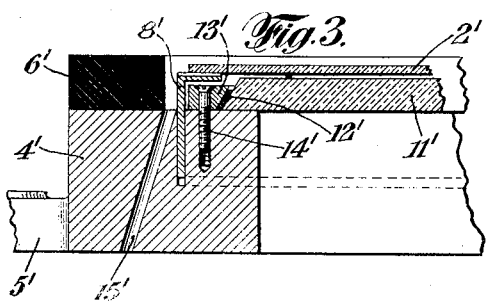
Fig. 3 is an enlarged sectional view of a part of a somewhat modified form of frame from that shown in Fig. 2.

From the foregoing description it will be appreciated by those skilled in the art that the invention may take other forms, and in Fig. 3 I illustrate another form of frame embodying the invention, this frame being substantially identical to that above described, except that instead of providing a celluloid enveloping diaphragm 11 I provide a rigid enveloping glass plate 11' which is secured to the main frame member 4' by suitable beveled strips or a suitable beveled rectangular frame as the case may be, 13', the frame being secured as in the first case, by screws 14'. In this case, however, instead of the flexible rubber strips 12 connected to the celluloid as in the first form, I provide rubber sealing strips 12' extending around the frame between the beveled edge of the glass 11' and the strip 13' to make a sealing joint. The remaining parts are substantially the same as shown and described in the previous form, Figs. 1 and 2, so no detailed description of those parts is necessary.

Figure 4:
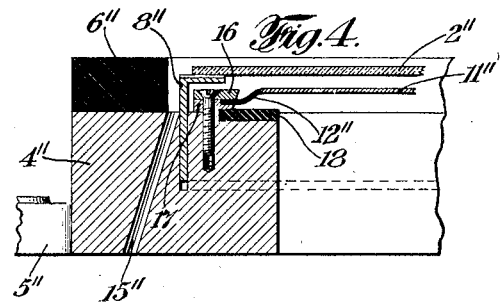
Fig. 4 is a similar view of a further modification.

In Fig. 4 I show a further modification illustrating a frame which is adapted to utilize either a celluloid diaphragm 11" like that of Fig. 2, or the rigid beveled glass plate like that of Fig. 3. To adapt the frame for this alternative use, instead of a beveled clamping frame or members 13' as shown in Fig. 3, I make this clamping frame of two thicknesses or parts 16 and 17, one of them having a recess for receiving the free end of the rubber strip 12"; and instead of utilizing the sealing strip on the edge of the glass as shown in Fig. 3, I provide a horizontal sealing strip 18 fitted in a recess in the main frame member 4" and extending slightly above the upper edge of this main frame member, so that if it is desired to use the rigid glass plate 11' of Fig. 3, the celluloid diaphragm 11" can be removed and the glass plate laid upon the strip 18 and forced down thereon by the composite bevel clamping frame parts 16 and 17. Otherwise this modification is like the former frame, so no further description need be made.

In Figs. 6, 7 and 8 another form of the invention is illustrated wherein instead of the above mentioned physical registration means for securing the negative onto the frame, I utilize vacuum means which might be termed individual suckers. In other respects this form is substantially like those heretofore described. In this form the frame 1ª is in the form of a rectangular hollow metal frame providing an air-tight chamber 19 extending entirely around the frame, and the upper part of the frame has secured thereto a sealing strip 6ª which is secured by means of a strip 20. The frame is also provided with an inner sealing strip 18ª upon which rests the rigid backing up enveloping beveled glass 11ª secured thereto in any suitable manner such as by the horizontal beveled strips or securing frame 13ª, so as to effect a sealing joint at this point with the glass. At suitable intervals around the frame there are provided a number of individual suckers 21 which preferably take the form of short rubber tubular members having a lower flange 22 fitting in a threaded recess within the main frame, and these flanges are held down on their seats by short sleeves 23 threaded into these recesses. The upper ends of these tubular suckers may have any suitable shape, and in the present form they are shown somewhat flared and of the same general contour as the upper edge of the sleeves 23, so that when the vacuum is created within the chamber 19 the flared mouths of these tubes will somewhat flatten out upon the negative and be drawn down so as to seat upon the upper edges of the sleeves 23 to make a solid seat so that they become a definitely fixed means of holding the negative in position and are not likely to be deflected laterally to permit the negative to shift laterally in the frame. When it is desired to position the negative on these suckers and secure the negative in a definite position on the frame, it is only necessary to lay the negative upon the suckers and create a vacuum in the chamber 19 whereupon the negative will be sucked down in position and held against these suckers, and they will in turn seat themselves on the upper edge of the sleeves 23.

Means must also be provided for producing the necessary suction within the enveloped space containing the negative, to force the same onto the zinc plate, and this is accomplished in this instance by a separate tubular passage 24 extending through the chamber 19 and up through the top surface of the main frame member 4ª. If suction is now produced in the passage 24 it will exhaust the air in the space between the sensitized surface and the negative, and also that between the negative and the pressure plate 11ª to cause the pressure plate to force the negative into the desired close contact with the sensitized zinc surface, the rubber strip 6ª yielding sufficiently to permit this while maintaining a tight seal around the space.

The vacuum in the frame 19 is controlled by a suitable valve which may be inserted in the pipe 25 as for example at the coupling 26, so that this valve will control the vacuum produced through the suckers on the adjacent surface of the negative. This pipe may connect to a pipe 26 leading to the passage 24 through the chamber 19 to the frame space as already described, and this pipe in turn may be provided with a valve 27 for controlling the vacuum to this space, or if desired only the one valve 27 may be used, eliminating any valve in the pipe 25; since when the valve 27 is closed suction will only be produced from the pipe 26 through the branch 25 and chamber 19 to the suckers, and when the valve 27 is then open suction will also be produced in the passage 24 to exhaust the space covered by the frame and enveloping means.

In Figs. 9 and 10 I have shown another form which differs from the form shown in Figs. 6, 7 and 8 only in the necessary constructional details to permit the use of a flexible enveloping member in the place of the rigid glass 11ª. In this last modification the metal frame may be exactly as shown in Figs. 7 and 8, and contains the same vacuum chamber 19', the same outer sealing strip 6ᵇ and the same tubular suckers 21ª for holding the negative 2ᵇ. But in view of the use of the celluloid enveloping member 11ᵇ, the following securing means is provided. In order that this frame may be used interchangeably with either the celluloid or the bevel glass plate, I provide a two-part securing means consisting of a securing frame or securing strips 28 held on the main frame member by screws 29, and I then use other detachable means 30 (a frame or strips) suitably detachably secured to the member 28. The rubber edges of the celluloid member 11ᵇ are clamped as shown between the members 28 and 30 to produce a seal at that point between the frame and the celluloid member, and in order to make a sealing joint between the main frame member and the lower securing frame 28, the rubber sealing strip 18ᵇ is left in the same position in which is it shown in Figs. 7 and 8. It will be seen from the above that this frame may be used interchangeably with glass or celluloid enveloping members merely by using the one-part or two-part securing members.

In Fig. 11 I have shown a further modification of frame which is also identical to that shown in Figs. 7 and 8, except for the form of the suckers and the control of the pneumatic pressure to be applied to the suckers and to the chamber in the frame, and I will therefore only describe these parts. Fig. 11 shows a view of the frame corresponding to the view illustrated in Fig. 7. The chamber 19ª extends around the frame as heretofore and is connected through a passage 31 with a second and smaller chamber 32 also extending around the frame and in turn connecting with the suckers 21ᵇ. The port or passage 31 from chamber 19ª to the chamber 32 is controlled in the following manner: A valve member 33 extends into the main frame member and is suitably packed with respect to the chambers 19ª and 32 and provided at its upper end with a lateral flange 34 seating on a cored out portion of the main frame member and at its lower end it is provided with a suitable washer 35 and held in position by a nut 36. The valve member 33 has its upper end cored out as shown at 37 so as to communicate with the opening 31 and an opening 38 in the main frame member leading to the chamber 19ª. The lower end of the valve member 33 is provided with a lever 39 for turning it so as to open or shut off communication between chamber 19ª and the suckers 21ª.

Communication between chamber 19ª and the space containing the negative is provided by a second valve member 40 having its upper end cored out to provide a passage 41 communicating at its lower end with a port 42 in the main frame member. This valve member also is provided with an upper flange 43 seated in the main frame, and with a lower washer 44, a retaining nut 45 and an actuating handle 46, so that it may be turned to open or cut off communication between the chamber 19ª and the enclosed space containing the negative.

The chamber 19ª is connected in any suitable manner as for example by a flexible pipe 47, with suction means, and above the flexible pipe 47 a valve 48 may be provided to open or close communication to the chamber.

The sucker 21ª is substantially the same as those heretofore referred to, except that the upper end or mouth of the sucker, instead of being tapered, is made thick and of right-angular section, so that it may be more accurately and precisely seated or forced down on its sleeve 23ᵇ when vacuum is produced, so as to insure against any lateral shifting of the negative with respect to the frame.

With a frame thus constructed and controlled, with the valves 33 and 40 closed, a vacuum may be produced in the main chamber 19$^a$, and the frame then, or while the vacuum is still being produced, may receive the negative 2$^c$, whereupon and after the negative is properly positioned in the frame, the valve 33 may be operated to connect the suckers with chamber 19$^a$ whereupon the negative will be firmly held in position on the frame. If the frame has not already been disconnected from the vacuum-producing means, it may now be disconnected and the frame put away for a while with the negative held in position due to the vacuum in the chamber 19$^a$. If after the desired lapse of time the frame is then taken over to a machine for printing onto a sensitized surface from the negative, when the frame is suitably located adjacent the sensitized surface, vacuum apparatus may be started up in communication with the chamber 19$^a$, and the valve 40 then operated to produce a vacuum in the space enclosing the negative over the face of the zinc, whereupon the negative will be forced into contact with the zinc. After the print has been made the valve 40 may be operated to close the passage 42; the vacuum over the zinc broken by any suitable outlet valve, but that in the chamber 19$^a$ retained so as to still hold the negative onto the frame for further movements of the frame and negative to another position on the zinc, and so on.

In Fig. 12 there is shown another form of frame utilizing a vacuum chamber 19$^b$, substantially like that just described except that the suckers and valve controlling mechanism for the same are eliminated and in lieu of the suckers I utilize a form of removable negative securing and positioning means in general like the part 8′ shown and described in the first modifications of the invention but specifically different therefrom. The chamber 19$^b$ is only used in this frame to conform to a standard type frame for possible convertible use, and to lighten the frame. The removable negative-securing means in this instance consists of a series of projections or pins 49 adapted to fit in holes suitably spaced in portions of the main frame so that the pins may be inserted in and removed from these holes. The pins or projections preferably take the form of dowel pins as shown, having leg portions 50 and broad flat heads 51 which if desired, in any suitable manner may have the center of the pin indicated thereon such as by a cross 52. There may be a few of these pins located at each corner of the frame or there may be one or more of them only located respectively along each side of the frame, the object being that there shall be a sufficient number of them so that they will accurately position and hold the negative upon the frame from lateral movement with respect thereto.

These pins like the part 8′ in the first modification, also constitute physical registration means as well as means for securing the negative in the frame, and they may be cemented to the negative in the same manner as described in connection with the parts 8′ in the first modification, by being mounted on a movable frame used in connection with the registration table, so that when the negative is suitably positioned on the registration table and cement applied to the heads of the pins, the pins may be moved into engagement with the negative and caused to adhere thereto, after which the negative with the pins firmly secured thereto may be positioned upon and secured to the vacuum frame by merely registering these pins with the openings in the frame and inserting them in the said openings. It is understood, of course, that the openings on the frame used in connection with the registration table, will correspond with the openings in the vacuum frame, so that when the pins are placed in the vacuum frame they will insure that the negative occupies the same relative position with respect to the vacuum frame that it occupied with respect to the registration table.

Either a bevel glass enveloping means or a flexible celluloid sheet may be used to force the negative in contact with the zinc plate when vacuum is produced, and in this instance I have shown the flexible celluloid sheet 11$^d$ sealed and secured to the frame as heretofore described, as by strips 16$^b$, suitably secured to strips 17$^b$, which in turn are secured in any suitable manner as by suitable screws, to the main frame member. In order to provide a seal between the member 17$^b$ and the main frame member, the heretofore described sealing strip 18$^d$ is used. It will be understood that the members 16$^b$ and 17$^b$ are used instead of one securing member merely in order that the frame may be utilized if desired with a rigid glass plate, in the same manner as heretofore described.

When the frame is brought against the sensitized surface and vacuum produced as heretofore described, the negative will be pressed into contact with the zinc plate as heretofore described, by reason of the pressure of the enveloping member 11$^b$ against the negative.

Fig. 14 merely shows a corner of the negative with two of the dowel pins secured to the lower surface thereof to serve as physical registration means.

It will be understood by those skilled in the art, after understanding my invention, that various other changes and modifications in the arrangement and construction of the parts may be made without departing from the spirit or scope of my invention, and I aim in the appended claims to cover all such modifications as are within the scope of the invention.

Having thus described my invention, what I claim as new and desire to secure by Letters Patent, is:

1. In apparatus of the character described, the combination of a frame for receiving and holding a negative to be printed from onto a sensitized surface, said frame supporting and securing the negative from lateral movement relative thereto so that the frame with the negative secured thereon may be moved together with respect to the sensitized surface, means for sealing the frame to the sensitized surface, transparent enveloping means extending over the frame opening at the rear of the negative and sealed to the frame and adapted through pneumatic pressure to press the negative into contact with the sensitized surface, and means of communication for exhausting the air from the space between the enveloping means and the sensitized surface.

2. In apparatus of the character described, the combination of a frame for receiving and holding a negative to be printed from onto a sensitized surface, means for securing the negative on the frame from lateral movement with respect thereto, means extending around the frame to seal it to the sensitized surface, transparent enveloping means across the frame opening at the rear of the negative and sealed to the frame and adapted through pneumatic pressure to press the negative into contact with the sensitized surface, detachable means for securing said enveloping means to the frame, and means of communication for exhausting the air from the space between the enveloping means and the sensitized surface.

3. In apparatus of the character described, the combination of a frame for receiving and holding a negative to be printed from onto a sensitized surface, means removably mounted upon the frame and adapted to have the negative secured thereto and serving to hold the negative in the frame so that the frame and negative may be moved together, means operatively related to the sensitized surface, frame and negative and serving to seal off from the atmosphere that portion of the sensitized surface covered by the negative, and means of communication for exhausting the air from over said portion of the sensitized surface to cause the negative to be forced into engagement with same.

4. In apparatus of the character described, the combination of a frame for receiving and holding a negative to be printed from onto a sensitized surface, a plurality of means constituting physical registration means for the negative, removably mounted upon the frame and adapted to have the negative secured thereto and serving to hold the negative in the frame, so that the frame and negative may be moved together, means operatively related to the sensitized surface, frame and negative and serving to seal off from the atmosphere that portion of the sensitized surface covered by the negative, and means of communication for exhausting the air from over said portion of the sensitized surface to cause the negative to be forced into engagement with same.

5. In apparatus of the character described, the combination of a frame for receiving and holding a negative to be printed from onto a sensitized surface, a plurality of pins removably mounted in corresponding holes in the frame and having heads adapted to have the negative secured thereto, and serving to accurately position the negative on the frame and hold it to the frame, so that the frame and negative may be moved together, means operatively related to the sensitized surface, frame and negative and serving to seal off from the atmosphere that portion of the sensitized surface covered by the negative, and means of communication for exhausting the air from over said portion of the sensitized surface to cause the negative to be forced into engagement with same.

6. In apparatus of the character described, the combination of a frame for receiving and holding a negative to be printed from onto a sensitized surface, means removably mounted upon the frame and adapted to have the negative secured thereto and serving to hold the negative in the frame so that the frame and negative may be moved together, means for sealing the frame to the sensitized surface, transparent enveloping means extending over the frame opening at the rear of the negative and sealed to the frame and adapted through pneumatic pressure to press the negative into contact with the sensitized surface, and means of communication for exhausting the air from the space between the enveloping means and the sensitized surface.

7. In apparatus of the character described, the combination of a frame for receiving and holding a negative to be printed from onto a sensitized surface, means on the frame adapted to engage the negative and hold the negative thereto by pneumatic pressure before the frame is brought in contact with the sensitized surface so that the frame and negative may be moved together, means operatively related to the sensitized surface, frame and negative and serving to seal off from the atmosphere that portion of the sensitized surface covered by the negative, and means of communication for exhausting the air from said negative-holding means and for also exhausting the air from over said portion of the sensitized surface to cause the negative to be forced into engagement with said surface.

8. In apparatus of the character described, the combination of a frame for receiving and holding a negative to be printed from onto a sensitized surface, said frame provided with physical registration means formed and positioned to slidably fit corresponding cooperating interfitting portions formed integral with the negative so that by such fitting parts the negative is slidably secured in a predetermined registered position on the frame from lateral movement relative thereto, and the frame with the negative secured thereon may be moved together with respect to the sensitized surface, means operatively related to the sensitized surface, frame and negative and serving to seal off from the atmosphere that portion of the sensitized surface covered by the negative, and means of communication for exhausting the air from over said portion of the sensitized surface to cause the negative to be forced into engagement with same.

9. In apparatus of the character described, the combination of a frame for receiving and holding a negative to be printed from in operative relation to a sensitized surface to be printed upon, means for securing the negative to the frame in a predetermined registered position against lateral movement in said frame, while the frame with the negative held thereby may be moved laterally with respect to the sensitized surface, means serving to seal off from the atmosphere the space between the sensitized surface and the negative, and means for exhausting air from said space to cause the negative to be forced into engagement with the sensitized surface.

In testimony whereof I have signed my name to this specification.

HARRY C. JONES.